(12) United States Patent
Weber et al.

(10) Patent No.: US 9,193,444 B2
(45) Date of Patent: Nov. 24, 2015

(54) DEVICE AND METHOD FOR INCREASING THE AERODYNAMIC LIFT OF AN AIRCRAFT

(71) Applicant: Airbus Operations GmbH, Hamburg (DE)

(72) Inventors: Carsten Weber, Bremen (DE); Markus Fischer, Weyhe (DE); Arne Grote, Braunschweig (DE); Rolf Radespiel, Braunschweig (DE); Martin Dreyer, Bremen (DE)

(73) Assignee: Airbus Operations GmbH (DE)

( * ) Notice: Subject to any disclaimer, the term of this patent is extended or adjusted under 35 U.S.C. 154(b) by 273 days.

(21) Appl. No.: 13/855,234

(22) Filed: Apr. 2, 2013

(65) Prior Publication Data

US 2013/0277495 A1    Oct. 24, 2013

Related U.S. Application Data

(63) Continuation of application No. PCT/EP2011/067404, filed on Oct. 5, 2011.

(60) Provisional application No. 61/390,326, filed on Oct. 6, 2010.

(30) Foreign Application Priority Data

Oct. 6, 2010   (DE) ................ 10 2010 047 643

(51) Int. Cl.
*B64C 3/00*      (2006.01)
*B64C 23/06*   (2006.01)
(Continued)

(52) U.S. Cl.
CPC . *B64C 23/06* (2013.01); *B64C 5/12* (2013.01); *B64C 9/34* (2013.01); *Y02T 50/162* (2013.01); *Y02T 50/44* (2013.01)

(58) Field of Classification Search
None
See application file for complete search history.

(56) References Cited

U.S. PATENT DOCUMENTS 1,549,122 A * 8/1925 Lanier ................... 244/204
1,749,021 A * 3/1930 Davis .................... 244/203
(Continued)

FOREIGN PATENT DOCUMENTS

FR    2951434 A1   4/2011
GB    1100376 A    1/1968
(Continued)

OTHER PUBLICATIONS

Chinese Office Action (Sep. 3, 2014).

*Primary Examiner* — Medhat Badawi
(74) *Attorney, Agent, or Firm* — Lerner, David, Littenberg, Krumholz & Mentlik, LLP

(57) ABSTRACT

A lift arrangement for an aircraft includes an aircraft fuselage section with an outside, an aerodynamic lift body attached to the aircraft fuselage section and extending from the aircraft fuselage section outwardly, and a pair of movably held add-on bodies arranged upstream of a leading edge of the aerodynamic lift body. The add-on bodies include an aerodynamically effective surface and are equipped with incoming airflow to generate vortices that impinge on the aerodynamic lift body, thus leading to an increase in lift on the aerodynamic lift body. Thus the lift generation on a lift body is effectively influenced, in particular to compensate for loss of lift as a result of icing. The add-on bodies are moveable, and, can be moved to a neutral position in which they do not project into the flow around the aircraft, and are thus not effective from the point of view of fluid dynamics.

13 Claims, 3 Drawing Sheets

(51) Int. Cl.
  *B64C 5/12* (2006.01)
  *B64C 9/34* (2006.01)

(56) References Cited

U.S. PATENT DOCUMENTS

| | | | | |
|---|---|---|---|---|
| 1,818,309 | A * | 8/1931 | De Villard | 244/210 |
| 2,852,209 | A * | 9/1958 | Petre | 244/215 |
| 2,924,400 | A * | 2/1960 | Ruget | 244/46 |
| 3,263,945 | A * | 8/1966 | Wimpenny | 244/200.1 |
| 4,039,161 | A * | 8/1977 | Bauer | 244/213 |
| 4,182,503 | A * | 1/1980 | Muscatell | 244/219 |
| 4,378,922 | A * | 4/1983 | Pierce | 244/199.1 |
| 4,381,091 | A * | 4/1983 | Pegram | 244/87 |
| 4,432,516 | A * | 2/1984 | Muscatell | 244/219 |
| 4,691,879 | A * | 9/1987 | Greene | 244/45 R |
| 4,705,240 | A * | 11/1987 | Dixon | 244/199.2 |
| 4,955,565 | A * | 9/1990 | Coplin | 244/204.1 |
| 5,253,828 | A * | 10/1993 | Cox | 244/200.1 |
| 5,366,180 | A * | 11/1994 | Wainfan et al. | 244/45 A |
| 5,398,888 | A * | 3/1995 | Gerhardt | 244/45 A |
| 5,755,408 | A * | 5/1998 | Schmidt et al. | 244/204 |
| 6,105,904 | A * | 8/2000 | Lisy et al. | 244/200.1 |
| 6,491,260 | B2 * | 12/2002 | Borchers et al. | 244/199.1 |
| 6,698,688 | B1 * | 3/2004 | Jones | 244/99.3 |
| 7,338,017 | B2 * | 3/2008 | Pitt | 244/174 |
| 7,475,848 | B2 * | 1/2009 | Morgenstern et al. | 244/35 R |
| 8,118,265 | B2 * | 2/2012 | Ferrari | 244/214 |
| 2006/0157613 | A1 * | 7/2006 | Adamson et al. | 244/1 N |
| 2007/0102575 | A1 * | 5/2007 | Morgan et al. | 244/87 |
| 2012/0205490 | A1 * | 8/2012 | Whitehouse et al. | 244/89 |
| 2013/0233976 | A1 * | 9/2013 | Nagel et al. | 244/201 |

FOREIGN PATENT DOCUMENTS

| | | |
|---|---|---|
| JP | 7291192 A | 11/1995 |
| JP | 8276897 A | 10/1996 |

* cited by examiner

DEVICE AND METHOD FOR INCREASING THE AERODYNAMIC LIFT OF AN AIRCRAFT

CROSS-REFERENCE TO RELATED APPLICATIONS

This application is a continuation of International Application No. PCT/EP2011/067404, filed Oct. 5, 2011, published in English, which claims the benefit of the filing date of German Patent Application No. 10 2010 047 643.9 filed Oct. 6, 2010, and of U.S. Provisional Patent Application No. 61/390,326 filed Oct. 6, 2010, the disclosures of which applications are hereby incorporated herein by reference.

TECHNICAL FIELD

The invention relates to a lift arrangement for increasing the aerodynamic lift of an aircraft. The invention furthermore relates to an aircraft that is equipped with at least one lift arrangement.

BACKGROUND TO THE INVENTION

In the state of the art a number of devices are used on aircraft, which devices are used to increase the aerodynamic lift or to locally influence the flow past an aircraft. For example add-on bodies are known that extend from an aircraft fuselage into the flow past the aircraft, which add-on bodies in the state of the art are referred to as "strake", "vortex generator", "fence", "LEX" and the like. Such add-on bodies are often used in combat aircraft where they act to generate vortices for influencing the airflow around the wing or around other parts of the combat aircraft in order to expand the flight envelope in the quest to achieve improved maneuverability. Examples of this can be found in the aircraft of the type F16, F18 and Aermacchi M436.

SUMMARY OF THE INVENTION

The known devices and methods for increasing the lift of aircraft comprise the disadvantages that have been stated as examples below.

Devices are known that always project into the airflow past the aircraft and accordingly permanently result in additional aerodynamic resistance during cruising. Furthermore, known devices are not equipped for operation in environments prone to icing, and consequently they are not in a position to shift flow separation of a lift surface in an environment prone to icing towards higher angles of attack, or in relation to a given surface or profile to provide a maximum of lift increase.

It is thus the object of the invention to reduce these disadvantages or to eliminate them altogether. In particular, it may be considered to be the object of the invention to propose a device and a method for increasing the lift, which device and method are at the same time suitable for use in environments prone to icing, and which device and method cause little or no aerodynamic resistance during a cruising state.

The object is met by a lift arrangement for an aircraft according to the characteristics of the independent claim 1. Advantageous improvements are stated in the subordinate claims.

A lift arrangement according to the invention for an aircraft comprises an aircraft fuselage section, an aerodynamic lift body, a drive means and a pair of movably held add-on bodies. The aircraft fuselage section comprises an outside and an inside. The aerodynamic lift body is attached to the aircraft fuselage section and extends from the aircraft fuselage section outwardly. The add-on bodies are arranged upstream of a leading edge of the aerodynamic lift body, are connected to the drive means, and are furthermore equipped to be moved to a neutral position in which the add-on bodies finish off so as to be flush with the outside of the aircraft fuselage and to at least one activation position in which the add-on bodies extend from the outside of the aircraft fuselage section outwardly. The add-on bodies further comprise an aerodynamically effective surface and are adapted in an activation position with airflow to generate vortices that impinge on the lift body, thus leading to an increase in lift on the lift body.

If the lift body is used in a iced environment, as a result of ice buildup on the profile form the airflow around the lift body and consequently the lift when compared to dry lift bodies can be significantly impeded. By using the upstream lift bodies, during their activation the energy generated by the profile inflow can be significantly increased, which partly or fully compensates for the loss of lift of the lift body subjected to ice buildup.

An aircraft fuselage section represents part of an aircraft fuselage, on which an aerodynamic lift body is arranged, for example in the form of a tail unit or a wing assembly. In this context it does not matter at which position this aircraft fuselage section is situated, and consequently it could be situated either in a bow region or in an aft region of the aircraft or in proximity thereof. Furthermore, as examples, horizontal stabilizers of commercial aircraft should be mentioned which could be arranged in a region close to the fuselage of an aircraft or in the form of a T-tail above a vertical stabilizer. At the same time this could also relate to tail units in a bow region, for example in the case of aircraft with a canard configuration.

The add-on bodies are arranged in front of the tail unit in the direction of flight, which corresponds to the above-mentioned term of "upstream". This results in the add-on bodies, depending on their individual alignment, being subjected to an aerodynamically caused force, while at the same time the airflow impinging on the add-on bodies is influenced by said add-on bodies and in the downstream wake of the add-on bodies, in which wake the aerodynamic lift body is also situated, cause an aerodynamic effect due to the shape of the add-on bodies. According to the concept according to the invention, the add-on bodies are designed in such a manner that this effect is realized in the form of vortex generation that influences the lift body situated in the wake in such a manner that the lift of said lift body is increased. To this effect the add-on bodies comprise an aerodynamically effective surface that is shaped, positioned and angled in such a manner that when subjected to airflow the desired effect results.

Preferably the add-on bodies are designed in such a manner that this effect almost exclusively arises in a particular, limited, range of the angle of attack of the aircraft, for example in order to improve controllability of a horizontal stabilizer during a landing approach at reduced speed with a longitudinal angle of inclination and/or angle of inclination of the path which differ/s from that during cruising.

With the use of the drive means the add-on bodies are movable in order to be moved to a neutral position in which the add-on bodies finish off flush to the outside of the aircraft fuselage section or do not appear in terms of fluid mechanics, in other words exert neither any force nor any displacement effect, and to at least one activation position in which the add-on bodies extend from the outside of the aircraft fuselage section outwardly. This is associated with a special advantage in that the add-on bodies can be deployed exclusively in those flight phases in which they are actually being used. In all the other flight phases the add-on bodies can be deactivated by way of the drive means and can, for example, be retracted to the interior of the aircraft fuselage section or can be folded to the aircraft fuselage section so that an undisturbed and aerodynamically smooth outer surface of the aircraft fuselage section results that corresponds to an aircraft fuselage section that does not have such add-on bodies.

In an advantageous embodiment the aerodynamic lift body is designed as a tail unit whose effect is improved as a result of the use of the add-on bodies. On the other hand the aerodynamic lift body can also be designed as a wing assembly so that as a result of activation of the add-on bodies the lift of the wing assembly is increased. It is understood that both variants could also be arranged concurrently on an aircraft in order to be able to increase both the lift of a wing assembly and the lift of a tail unit.

In order to improve the effect, according to the invention, of vortex formation and influencing the lift of an aerodynamic lift body it may be advantageous if the add-on bodies form a gap to the lift body. As a result of the enlarged wake resulting from this, the influence of vortices generated by the add-on bodies could be increased; in return, as a result of this, the surface of the lift body could also be dimensioned so as to be smaller.

In an advantageous improvement the add-on bodies are arranged on the leading edge of the aerodynamic lift body. As a result of this the lift body with the attached add-on bodies is very easy to produce and could, for example, also be manufactured as an integral component in which in an activation position the basic shape of the tail unit corresponds to the shape of an original tail unit with attached add-on bodies.

According to an equally advantageous embodiment of the invention, the add-on bodies could, for example, be held at a leading edge of the aerodynamic lift body and at the same time could be designed so as to be rotatable or pivotable about the leading edge of the tail unit. In this way the design and configuration of the add-on bodies could be simplified somewhat because the add-on bodies do not depend on a position of the lift body, but instead, for example, an angle of attack of the add-on bodies can be optimized separately with predetermined angle of attacks of the lift body.

In an advantageous improvement the lift body is at least in some sections held so as to be pivotable about an axis which at least in part extends radially to the aircraft fuselage section. This is, for example, realized by a rear horizontal stabilizer which for the purpose of initiating a descent or landing approach of an aircraft could be fully rotated in order to relieve elevators arranged on the horizontal stabilizer.

According to an advantageous embodiment of the invention, each add-on body can comprise a shape selected from a group of geometric shapes, wherein this group could comprise the following basic shapes:
 triangular shape,
 ogival shape,
 delta plan view with a polynomial leading edge,
 delta plan view with a leading edge in the shape of a partial circular arc,
 partial circular arc, and
 any combination of these basic shapes.

The size of the add-on bodies $R_a$ is preferably in the following range (relative to the aerodynamically effective surface of the lift body): $0<R_a<20\%$ S. The angle of sweepback of the leading edge of the add-on body is preferably greater than 60°, i.e. $\phi_{VK}>60°$.

The shape of the leading edge in conjunction with a planar plate would improve the effectiveness of the lift body by increasing vortex generation. These basic shapes result in a reduction in size of the add-on body and consequently in a reduction of loads and weights.

In an advantageous embodiment of the invention, drive means for the add-on body are centrally controlled by a flight control computer in order to move the add-on bodies, when required, from their neutral position to an activation position.

In an advantageous embodiment of the invention the aerodynamic lift body is a horizontal stabilizer that by means of a trimmable horizontal stabilizer actuator is movably held on the aircraft fuselage section, and wherein the drive means for the add-on bodies is coupled to the trimmable horizontal stabilizer actuator in such a manner that, when the horizontal stabilizer is moved from a neutral position to a desired adjustment position, movement of the add-on bodies from the neutral position to an activation position takes place. This means that control of the add-on bodies could, for example, take place decentrally at the location of the horizontal stabilizer. Continuous feedback of the position of the trimmable horizontal stabilizer actuator of a horizontal stabilizer to a control computer of the aircraft makes it possible, by tapping the position of the trimmable horizontal stabilizer actuator, to continuously obtain inference relating to the current aerodynamic requirements, which inference could be used for automatic activation of the add-on bodies. Central control of the add-on bodies is thus not required in order to increase the aerodynamic effect of the horizontal stabilizer in particular flight situations, so that merely from coupling the state of the trimmable horizontal stabilizer actuator in a very simple manner an improvement in the effect of the horizontal stabilizer can be achieved.

Preferably, the add-on bodies are mechanically connected to the trimmable horizontal stabilizer actuator so that directly from a movement of the trimmable horizontal stabilizer actuator without any further measures or interposed systems or devices movement of the add-on bodies can take place. These mechanical connections could be imaginable by means of belt drives, chain drives, push rods, push rod gear assemblies, cams, hydraulic or pneumatic gear arrangements.

Preferably, the add-on bodies comprise a heating device so that during flight in a state prone to icing the add-on bodies are always still movable and after their use can be moved from an activation position to a neutral position, or prior to their use can be moved from the neutral position to an activation position. If the add-on bodies are of a folding nature, heating the entire surface of the add-on bodies suggests itself, wherein in the case of add-on bodies retracting into the aircraft fuselage section, heating of a outward-facing end of the add-on bodies and of a peripheral region of the associated opening of the aircraft fuselage section suggests itself.

Likewise, the object is met by an aircraft comprising an aircraft fuselage, which aircraft comprises at least one aircraft fuselage section designed according to the above-mentioned criteria.

Finally, a method according to the further independent claim meets the above-mentioned object. The method according to the invention involves the steps of moving add-on bodies relative to an aircraft fuselage section as soon as a lift-increasing effect of a lift body is desired.

BRIEF DESCRIPTION OF THE DRAWINGS

Further characteristics, advantages and application options of the present invention are disclosed in the following description of the exemplary embodiments and of the figures. All the described and/or illustrated characteristics per se and in any combination form the subject of the invention, even irrespective of their composition in the individual claims or their interrelationships. Furthermore, identical or similar components in the figures have the same reference characters.

DETAILED DESCRIPTION OF EXEMPLARY EMBODIMENTS

Figure 1:
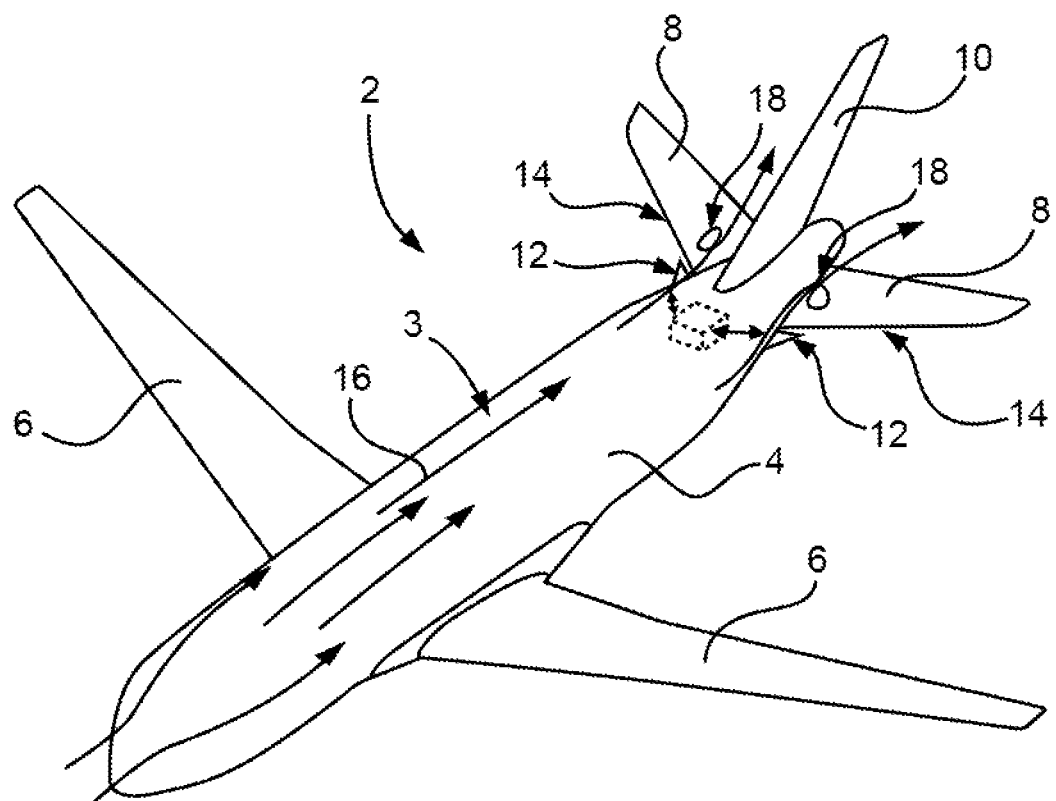
FIGS. 1 and 2 show an aircraft comprising a horizontal stabilizer and a pair of add-on bodies arranged upstream thereof.

FIG. 1 shows an aircraft 2 comprising an aircraft fuselage 4 with an outside 3 that delimits the aircraft fuselage 4 towards the outside, two wing assembly halves 6, two horizontal stabilizer halves 8, a vertical stabilizer 10 and a pair of add-on bodies 12. The horizontal stabilizer halves 8 are arranged in an aft region of the aircraft 2, wherein the add-on bodies 12 are arranged upstream, so as to form a gap, spaced apart from leading edges 14 of the tail unit halves 8. The horizontal stabilizer halves 8 together form a horizontal stabilizer which in the sense of the invention can be regarded as being an aerodynamic lift body.

With the airflow over the aircraft, which airflow is indicated by airflow vectors 16, as a result of the add-on bodies 12 vortices 18 are induced in their wake, in other words in the region of the horizontal stabilizer halves 8, which vortices 18 result in an increase in lift on the horizontal stabilizer halves 8. At the same time with a corresponding design of the add-on bodies 12, lift can be generated by the add-on bodies 12 themselves so that in the final analysis a significant improvement of the lift of the horizontal stabilizer at the rear of the aircraft 2, which is shown as an example, is achieved.

Figure 2:
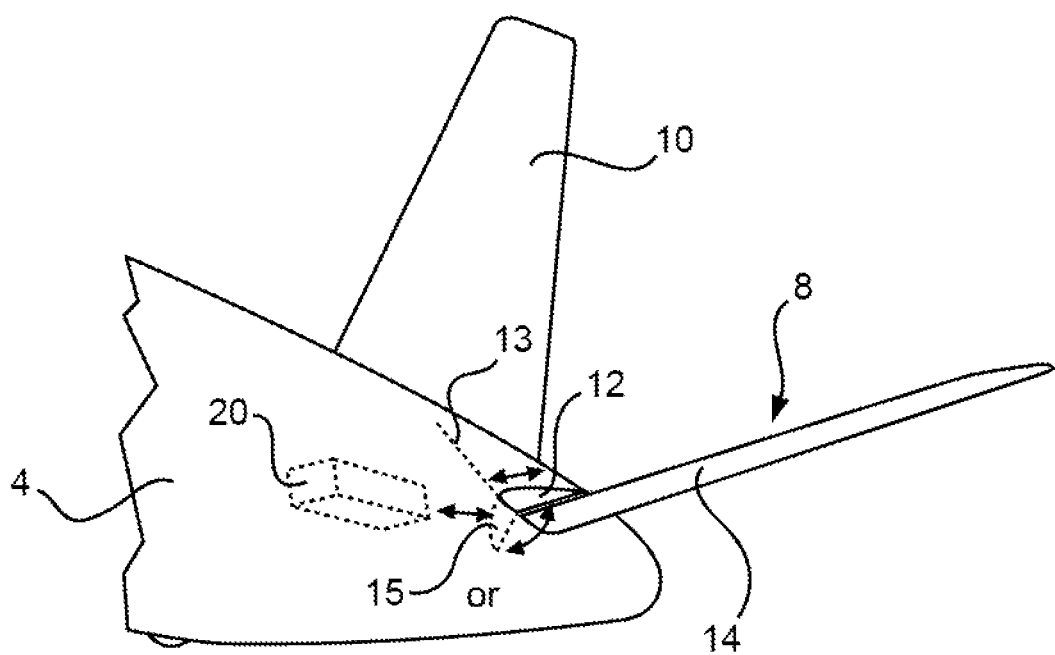

FIG. 2 in a somewhat different view shows a horizontal stabilizer half 8 and an add-on body 12, arranged upstream thereof, wherein FIG. 2 shows that there could be a gap between the add-on body 12 and the leading edge 14 of the horizontal stabilizer half 8.

Figure 3:
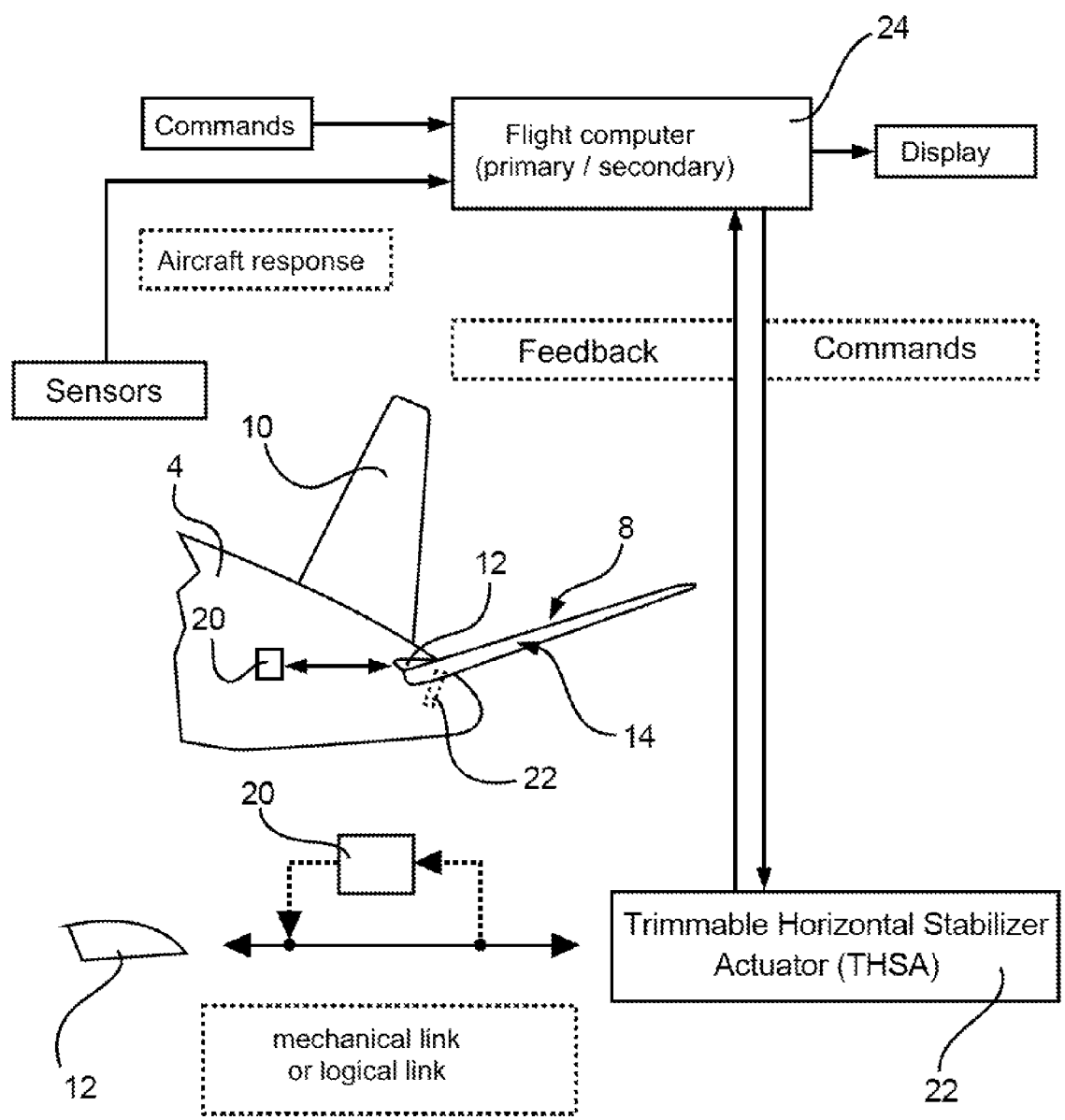
FIG. 3 shows a diagrammatic block-based view of a feedback control system comprising a coupling of a trimmable horizontal stabilizer actuator for a horizontal stabilizer with drive kinematics for add-on bodies.

FIG. 3 also shows that an add-on body 12 could, for example, be connected to a drive means 20 in order to be moved from an activation position, in which the add-on body 12 extends from the aircraft fuselage 4 outwardly, to a neutral position, in which the add-on body 12 totally disappears within the aircraft fuselage 4 and closes off so as to be flush with the surface of the aircraft fuselage 4. The add-on body could be held so as to be pivotable on an axis 13 and could reach its neutral position in that it is pivoted on the axis 13 into an indentation 15 that is designed in such a manner that the aircraft fuselage section in this region with the add-on body 12 in its neutral position comprises as smooth a surface as possible. Controlling the drive means 20 can take place in many ways. This example shows that the drive means 20 can be force-coupled to a trimmable horizontal stabilizer actuator 22, wherein the trimmable horizontal stabilizer actuator 22, THSA, is only used to rotate the horizontal stabilizer halves 8 so as to set a desired trim state of the aircraft. The trimmable horizontal stabilizer actuator 22 is generally connected to flight control computers 24 that regulate its movement. By means of position feedback, in the feedback control system a target/actual adjustment of the position of the horizontal stabilizer becomes possible. In order to improve the aerodynamic performance of the horizontal stabilizer, for example during an approach to landing the aircraft 2, during which the horizontal stabilizer is moved to a specific adjustment position, it is particularly advantageous to connect the drive means 20 to the trimmable horizontal stabilizer actuator 22. This means that when the horizontal stabilizer is moved to a desired adjustment position the add-on bodies 12 are activated, and when the horizontal stabilizer is moved back to a neutral position or cruising position the add-on bodies 12 are deactivated and moved to the neutral position.

The drive means 20 could be designed either as an independent actuator or as a forced mechanical coupling between a trimmable horizontal stabilizer actuator 22 and corresponding articulation kinematics for activating the add-on bodies 12.

Figure 4:
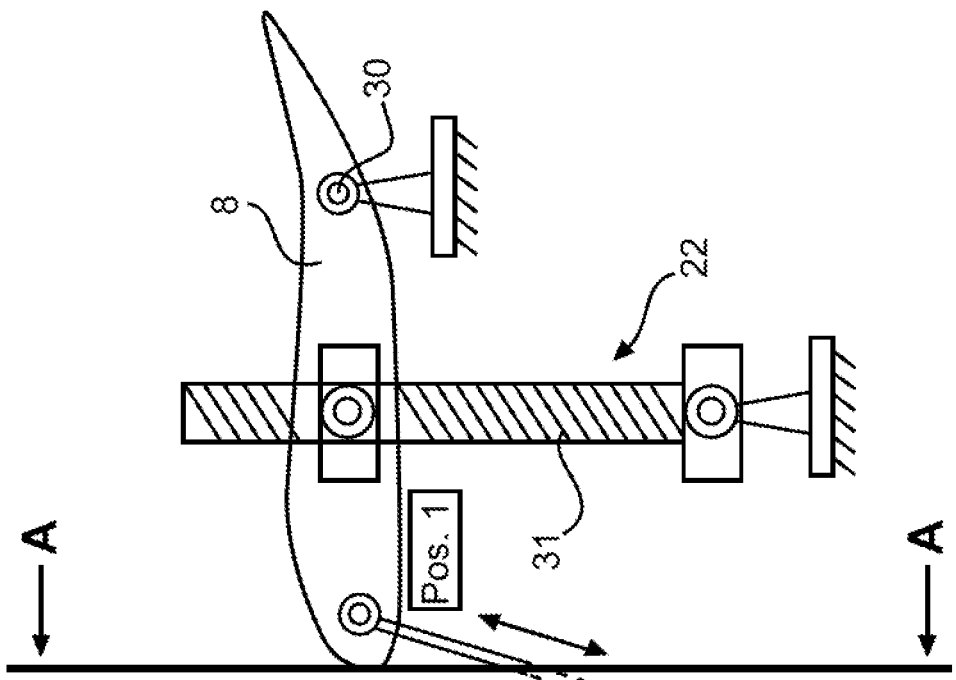
FIG. 4 shows a diagrammatic view of the kinematic articulation and function of the drive kinematics for add-on bodies as an exemplary embodiment of a method according to the invention.
Figure 4:
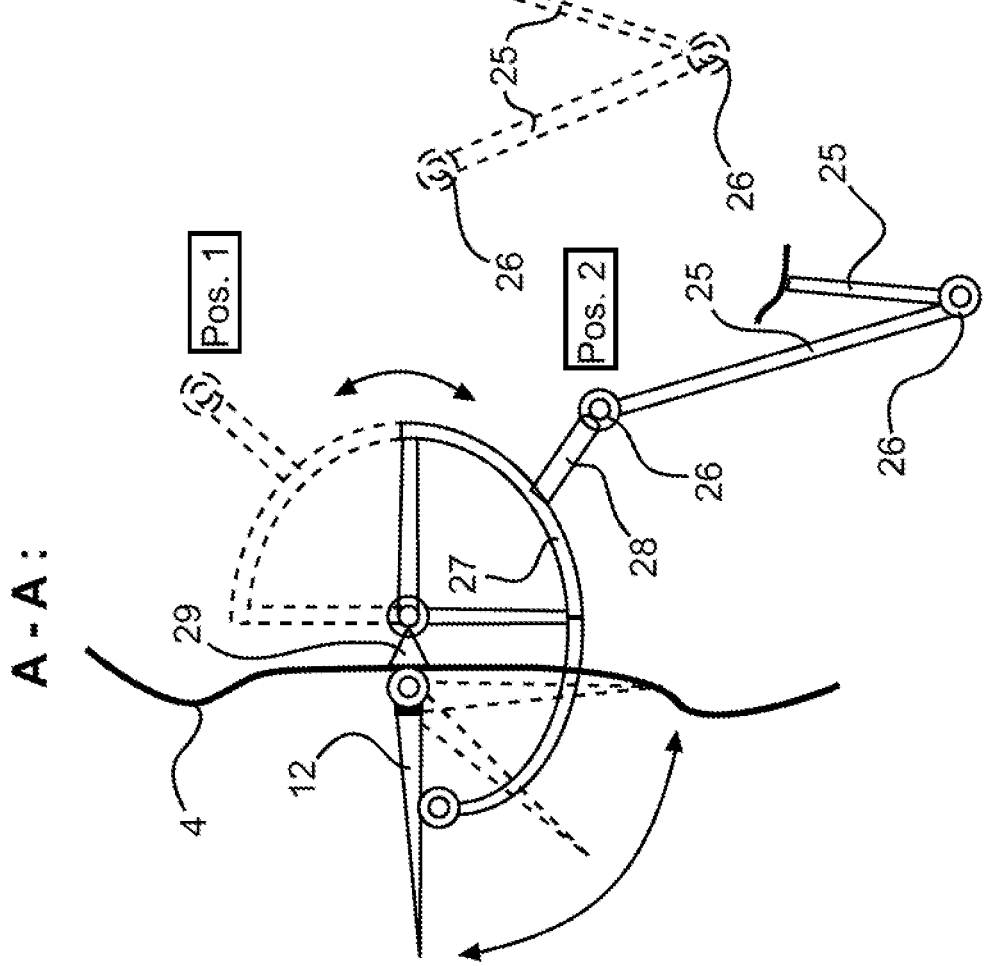

FIG. 4 shows a mechanical coupling arrangement between a trimmable horizontal stabilizer actuator 22 and an add-on body, without the need to be reliant on electronic means. The right-hand side of this figure shows a section view of the horizontal stabilizer 8 and of the trimmable horizontal stabilizer actuator 22. Furthermore, the left-hand side shows view A, i.e. a view of the installation situation rotated by 90°, in front of or upstream of the horizontal stabilizer 8 and of the trimmable horizontal stabilizer actuator 22. On the right-hand part of FIG. 4 the horizontal stabilizer 8 is shown in a neutral position, designated "Pos. 1". This neutral position corresponds to a low-resistance position as is predominantly the case during cruising flight. In this position the horizontal stabilizer 8 predominantly needs to meet stability conditions.

In the case of takeoff and also landing, the horizontal stabilizer 8 needs to be moved because of changed trim conditions, in this case increased downthrust required on the horizontal stabilizer 8, and/or needs to be moved because of controllability requirements. This takes place by means of the trimmable horizontal stabilizer actuator 22. In this arrangement the horizontal stabilizer 8 is moved downwards, in the direction of the arrow, on a trim spindle 31, and at the same time the rear part of said horizontal stabilizer 8 is pivoted on a fulcrum, the so-called pivot point 30.

During this movement a push rod assembly, comprising push rods 25 that are interconnected by pivot joints 26, is moved downwards. For the sake of clarity the designated push rods 25 and also the designated pivot joints 26 are shown both in the right-hand part of FIG. 4 and in the left-hand part. These are thus the same push rods, but they are viewed from different directions.

The left-hand part of the figure shows extension kinematics 27 attached to the aircraft fuselage 4 by way of a bearing arrangement 29 that makes it possible for the extension kinematics 27 to pivot on this point. At the same time the extension kinematics 27 comprise an articulation arm 28 firmly connected to them, which articulation arm 28 is pivotally connected to the push rod assembly.

When the horizontal stabilizer 8 and at the same time the push rod assembly is moved downwards, the extension kinematics 27 are rotated, by way of the articulation arm 28, from Pos. 1 (shown in dashed lines) in the direction of Pos. 2, as an example counterclockwise. In this process the extension kinematics 27 at the same time move the add-on body 12, which is pivoted to the aircraft fuselage 4, in the direction of an activation position, so that said add-on body 12 deploys its aerodynamic effect.

As soon as this trim position or downthrust position of the horizontal stabilizer 8 is to be moved out of, i.e. as soon as the trimmable horizontal stabilizer actuator 22 moves the horizontal stabilizer 8 back to Pos. 1, at the same time the add-on body 12 is also moved in the direction of the neutral position.

In addition, it should be pointed out that "comprising" does not exclude other elements or steps, and "a" or "one" does not exclude a plural number. Furthermore, it should be pointed out that characteristics or steps which have been described with reference to one of the above exemplary embodiments can also be used in combination with other characteristics or steps of other exemplary embodiments described above. Reference characters in the claims are not to be interpreted as limitations.

LIST OF REFERENCE CHARACTERS

2 Aircraft
3 Outside
4 Aircraft fuselage
6 Wing assembly half
8 Horizontal stabilizer half
10 Vertical stabilizer
12 Add-on body
13 Axis
14 Leading edge
16 Airflow
18 Vortex
20 Drive means
22 Trimmable horizontal stabilizer actuator
24 Flight control computer
25 Push rod
26 Articulation
27 Extension kinematics
28 Articulation arm
29 Bearing arrangement
30 Pivot point
31 Trim spindle

The invention claimed is:

1. A lift arrangement for an aircraft, comprising:
an aircraft fuselage section with an outside,
an aerodynamic lift body attached to the outside of the aircraft fuselage section and extending from the aircraft fuselage section outwardly,
a drive means, and
a pair of movably held add-on bodies arranged upstream of a leading edge of the aerodynamic lift body,
wherein the add-on bodies are connected to the drive means and are configured to be moved to a neutral position wherein the add-on bodies finish off so as to be flush with the outside of the aircraft fuselage section and to be moved to at least one activation position wherein the add-on bodies extend from the outside of the aircraft fuselage section outwardly,
wherein the add-on bodies comprise an aerodynamically effective surface and are equipped in the at least one activation position with airflow to generate vortices that impinge on the aerodynamic lift body, thus leading to an increase in lift on the aerodynamic lift body,
wherein the aerodynamic lift body is a moveable horizontal stabilizer attached to the aircraft fuselage section and is moveable by a trimmable horizontal stabilizer actuator, and
wherein the drive means is coupled to the trimmable horizontal stabilizer actuator in such a manner that when the horizontal stabilizer is moved from a neutral position to a desired adjustment position, movement of the add-on bodies from the neutral position to the activation position takes place.

2. The lift arrangement of claim 1, wherein the aerodynamic lift body is a tail unit.

3. The lift arrangement of claim 1, wherein the aerodynamic lift body is a wing assembly.

4. The lift arrangement of claim 1, wherein the add-on bodies form a gap to the aerodynamic lift body.

5. The lift arrangement of claim 1, wherein the add-on bodies are arranged on a leading edge of the aerodynamic lift body.

6. The lift arrangement of claim 5, wherein the add-on bodies are held at a leading edge of the aerodynamic lift body and are rotatable on the leading edge of the aerodynamic lift body.

7. The lift arrangement of claim 1, wherein the aerodynamic lift body is at least in some sections held so as to be pivotable on an axis at least partly extending radially to the aircraft fuselage section.

8. The lift arrangement of claim 1, wherein each add-on body comprises a shape selected from a group of geometric shapes, with the group consisting of:
a triangular shape,
an ogival shape,
a delta plan view with a polynomial leading edge,
a delta plan view with a leading edge in the shape of a partial circular arc,
a partial circular arc, and
any combination of these geometric shapes.

9. The lift arrangement of claim 1, wherein the drive means is coupled to the trimmable horizontal stabilizer actuator by a mechanical push rod assembly.

10. The lift arrangement of claim 1, wherein the add-on body in a neutral position of the add-on body extends from an outside of the aircraft fuselage section into the aircraft fuselage section.

11. The lift arrangement of claim 1, wherein the add-on body in a neutral position of the add-on body conforms to the aircraft fuselage section so as to be flush on the surface.

12. The lift arrangement of claim 11, wherein the aircraft fuselage section comprises an indentation for accommodating the add-on body.

13. An aircraft, comprising an aircraft fuselage with at least one lift arrangement comprising:
an aircraft fuselage section with an outside,
an aerodynamic lift body attached to the outside of the aircraft fuselage section and extending from the aircraft fuselage section outwardly,
a drive means, and
a pair of movably held add-on bodies arranged upstream of a leading edge of the aerodynamic lift body,
wherein the add-on bodies are connected to the drive means and are configured to be moved to a neutral position wherein the add-on bodies finish off so as to be flush with the outside of the aircraft fuselage section and to be moved to at least one activation position wherein the add-on bodies extend from the outside of the aircraft fuselage section outwardly,
wherein the add-on bodies comprise an aerodynamically effective surface and are equipped in the at least one activation position with airflow to generate vortices that impinge on the aerodynamic lift body, thus leading to an increase in lift on the aerodynamic lift body,
wherein the aerodynamic lift body is a moveable horizontal stabilizer attached to the aircraft fuselage section and is moveable by means of a trimmable horizontal stabilizer actuator, and
wherein the drive means is coupled to the trimmable horizontal stabilizer actuator in such a manner that when the horizontal stabilizer is moved from a neutral position to a desired adjustment position, movement of the add-on bodies from the neutral position to the at least one activation position takes place.

\* \* \* \* \*